US009019069B2

(12) United States Patent
Mahapatra et al.

(10) Patent No.: US 9,019,069 B2
(45) Date of Patent: Apr. 28, 2015

(54) CONFIGURATION OF SECURITY DEVICES USING SPATIALLY-ENCODED OPTICAL MACHINE-READABLE INDICIA

(71) Applicant: Sensormatic Electronics, LLC, Boca Raton, FL (US)

(72) Inventors: Sarthak Mahapatra, Karnataka (IN); Chandrasekaran Kalyanaraman, Karnataka (IN)

(73) Assignee: Sensormatic Electronics, LLC, Boca Raton, FL (US)

( * ) Notice: Subject to any disclaimer, the term of this patent is extended or adjusted under 35 U.S.C. 154(b) by 156 days.

(21) Appl. No.: 13/761,564

(22) Filed: Feb. 7, 2013

(65) Prior Publication Data

US 2014/0218164 A1 Aug. 7, 2014

(51) Int. Cl.

| | |
|---|---|
| *G08B 19/00* | (2006.01) |
| *H04L 29/06* | (2006.01) |
| *G08B 25/00* | (2006.01) |
| *H04W 12/04* | (2009.01) |
| *H04L 12/24* | (2006.01) |
| *G08B 25/14* | (2006.01) |

(52) U.S. Cl.
CPC .............. *H04L 63/08* (2013.01); *G08B 25/003* (2013.01); *G08B 25/14* (2013.01); *H04L 63/20* (2013.01); *H04W 12/04* (2013.01); *H04L 41/0803* (2013.01)

(58) Field of Classification Search
CPC ........ G08B 13/00; G08B 19/00; G08B 25/00; H07M 11/04; H04W 24/00
USPC ............. 340/5.1, 506, 518, 539.11, 541, 628, 340/632; 715/771
See application file for complete search history.

(56) References Cited

U.S. PATENT DOCUMENTS

| | | | |
|---|---|---|---|
| 2006/0135064 A1 | 6/2006 | Cho et al. | |
| 2008/0039063 A1* | 2/2008 | Ichieda | 455/420 |
| 2010/0023865 A1 | 1/2010 | Fulker et al. | |
| 2012/0124799 A1* | 5/2012 | Addy | 29/407.1 |
| 2012/0188072 A1* | 7/2012 | Dawes et al. | 340/514 |

FOREIGN PATENT DOCUMENTS

| | | |
|---|---|---|
| EP | 2 546 815 A1 | 1/2013 |
| WO | 2012135563 A1 | 10/2012 |

OTHER PUBLICATIONS

Quick Installation Guide, Zmodo Fox IP Camera (IPC_Quick_Guide.pdf), Zmodo Company, Apr. 27, 2013.
International Search Report and Written Opinion of the International Searching Authority, mailed Apr. 4, 2014, from International Application No. PCT/US2013/076001, filed Dec. 18, 2013.

* cited by examiner

*Primary Examiner* — Phung Nguyen
(74) *Attorney, Agent, or Firm* — Houston & Associates, LLP

(57) ABSTRACT

A method and system for configuring security devices on a security network. A mobile computing device reads spatially-encoded optical machine-readable indicia, decodes the indicia, and extracts encoded configuration information for the security devices. The configuration information from the indicia is then transmitted to a monitoring station, which uses the configuration information to configure communication with the security devices on the security network.

30 Claims, 5 Drawing Sheets

CONFIGURATION OF SECURITY DEVICES USING SPATIALLY-ENCODED OPTICAL MACHINE-READABLE INDICIA

BACKGROUND OF THE INVENTION

Security systems are often deployed in schools, government buildings, and corporate offices, and even many residences. These security systems are comprised of security devices such as door controllers, security cameras, access control readers, video servers, access control panels, intrusion panels, and elevator control systems, to list a few examples.

Generally, the security devices are used to monitor locations in and around buildings and enable authorized users to access restricted areas through locked doors, for example. Typically, the security devices are connected to a security network and are controlled by a control system (or monitoring station). In an example, an access control reader reads an employee keycard while a security camera simultaneously monitors and records the employee's movements. If the employee is authorized to access the restricted area, then the monitoring station instructs the door controller to unlock the door.

The installation of security devices in security systems is often complex and time consuming. First, an installer has to identify and select locations throughout the building to install the security devices. Next, the installer has to physically mount the security devices in the building and supply power to the security devices. Next, the installer must connect all of the security devices to the security network. In many cases, connecting the security devices to the security network requires running data cables from data transmission devices (e.g., routers, switches, and hubs) to all of the security devices.

After the physical installation of the security devices is complete, the installer must then configure each security device for communication with the monitoring station and/or other security devices on the security network. Generally, configuration of the security devices is tedious, requiring repeatedly entering configuration information such as device names, Internet Protocol (IP) addresses, media access control (MAC) addresses, device locations, and/or serial port settings for devices. In many cases, the installer has to travel between different locations throughout the office building to configure the security devices, the security network, and the monitoring station of the security network.

SUMMARY OF THE INVENTION

Because the installation and configuration for the security devices is time consuming and susceptible to human errors, it is probable that the installer will incorrectly enter at least some of the configuration information. Additionally, configuration information may need to be updated throughout the operation life of the security devices. Furthermore, the configuration information typically needs to be entered accurately for the security devices to operate on the security network and be able to communicate with the monitoring station (or other security devices).

The present solution is directed to using a mobile computing device, for example, to extract configuration information of the security devices from spatially-encoded optical machine-readable indicia such as two-dimensional bar codes (or matrix bar codes), one-dimensional bar codes, and/or other machine readable indicia.

In one example, a mobile computing device reads an indicium, decodes the indicium, and extracts the configuration information. The configuration information from the indicium is then entered into a configuration client executing on the mobile computing device. The configuration information is then transmitted from the mobile computing device to the security system, such as a monitoring station, which uses the configuration information to communicate and/or control the security devices on the security network of the security system.

In general, according to one aspect, the invention features a method for configuring a security network. The method includes reading spatially-encoded optical machine-readable indicia with a mobile computing device, the spatially-encoded optical machine-readable indicia being associated with and encoding configuration information for the security devices. The method further includes decoding the configuration information from the spatially-encoded optical machine-readable indicia and using the configuration information to configure communication with the security devices on a security network of the security system.

In general, according to another aspect, the invention features a security system with security network configuration capability. The system includes security devices for installation in a security network. Spatially-encoded optical machine-readable indicia are associated with the security devices. They encode configuration information of the security devices. A mobile computing device is used to read the indicia and decode the configuration information. A monitoring station is provided for monitoring the security devices in the security network; the monitoring station uses the configuration information from the mobile computing device to configure communication with the security devices over the security network.

In general, according to another aspect, the invention features a security device package. The security device package includes a security device for installation in a security network and a spatially-encoded optical machine-readable indicium that is associated with the security device that encodes security network configuration information.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms of the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
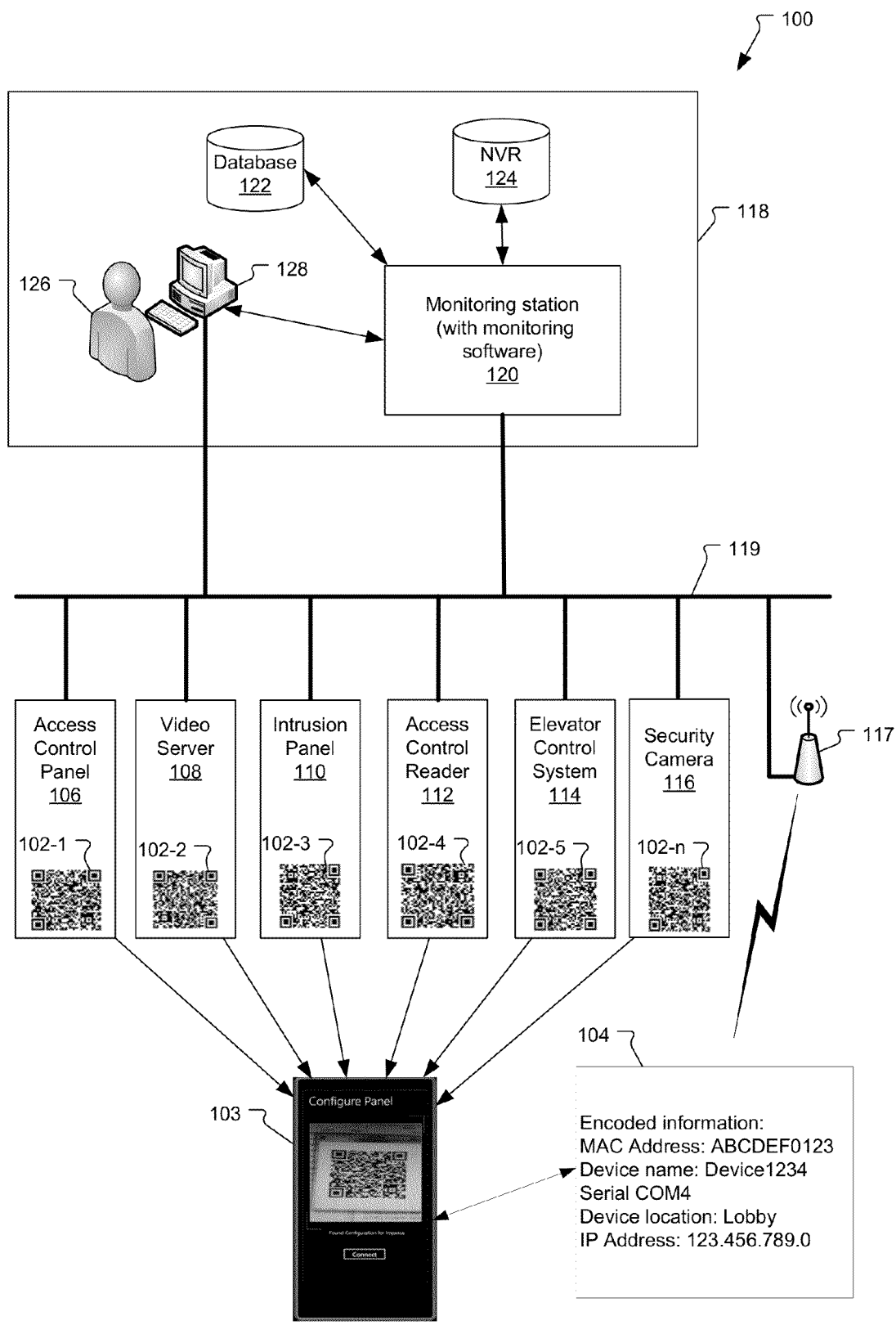
FIG. 1 is a schematic diagram of a security system including security devices that are installed on a security network.

FIG. 1 is schematic diagram of a security system 100 including security devices installed on the security network 119, which has been constructed according to the principles of the present invention.

In a typical implementation, the security devices of the security system 100 include access control panels 106, video servers 108, intrusion panels 110, access control readers 112, elevator control systems 114, and/or security cameras 116, to list a few examples. Additional security devices (not shown) include motion sensors, door controllers, thermal or night vision cameras, RFID readers, checkpoint security door alarms, smoke detectors, and/or fire alarms, to list a few further examples.

Associated with each security device 106 to 116 is a spatially-encoded optical machine-readable indicium, which is a two-dimensional bar code that is encoded with configuration information for the respective security device. Alternatively the indicia are one dimensional machine readable indicia (e.g., Universal Product Code bar codes), or other types of machine readable indicia.

The indicia are encoded with configuration information of the security devices 106 to 116. In a typical implementation, the configuration information 104 includes device names, Internet Protocol (IP) addresses, media access control (MAC) addresses, object globally unique identifiers (GUIDs), and/or serial port settings for the security devices 106 to 116.

A mobile computing device 103 is preferably used to read the indicia. It takes a picture of the indicia using a built in camera. A built-in scanner is used in other embodiments. The mobile device 103 decodes the configuration information from the indicia, then uses the encoded configuration information to configure communications for the security devices 106 to 116 of the security network 119 of the security system 100. In the illustrated embodiment, the mobile computing device is a smartphone. In alternative embodiments, the mobile computing device is a tablet or slate computer, a laptop computer, or personal digital assistant, to list a few examples.

In the illustrated example, the security devices 106 to 116 are connected to the security network 119 of the security system 100. In a typical implementation, the security network 119 includes wired and/or wireless portions. Generally, the security network is a public or private data network such as a local area network, a bus network, a third generation mobile data network, or a fourth generation mobile data network, to list a few examples. In one embodiment, the security network 119 is transmitted over Transmission Control Protocol (TCP)/Internet Protocol (IP), Hypertext Transfer Protocol (HTTP), or other standard protocols over the local area network (or wide area network). In embodiments of the security network 119 that include a wireless portion, one or more wireless access points 117 are deployed to enable wireless devices (e.g., the mobile computing device) to connect with the security network 119.

In a typical implementation, the security system 100 further includes a security office (or control room) 118, which houses the monitoring station (with monitoring software) 120, a database 122, a network video recorder (NVR) 124, and a workstation 128.

In a typical implementation, the database 122 stores configuration files that include the configuration information 104 received from the mobile device 103. The configuration information accessed by the monitoring station 120 and used to communicate with the security devices 106 to 116. In an alternative embodiment, the monitoring station 120 is not located on the premises with the security devices 106 to 116. Rather, the monitoring station 120 is located offsite. The NVR 124 stores video and audio data captured by security cameras (e.g., reference numeral 116). Typically, the monitoring station 120 adds time and date information to the captured audio and video data to allow the data to be indexed and reviewed at a later date. The control room 118 further includes a workstation 128, which is operated by a user 126. The workstation allows the user 126 to create, edit, and receive indicia as well as observe the performance of the monitoring station 120, database 122, and NVR 124.

Figure 2:
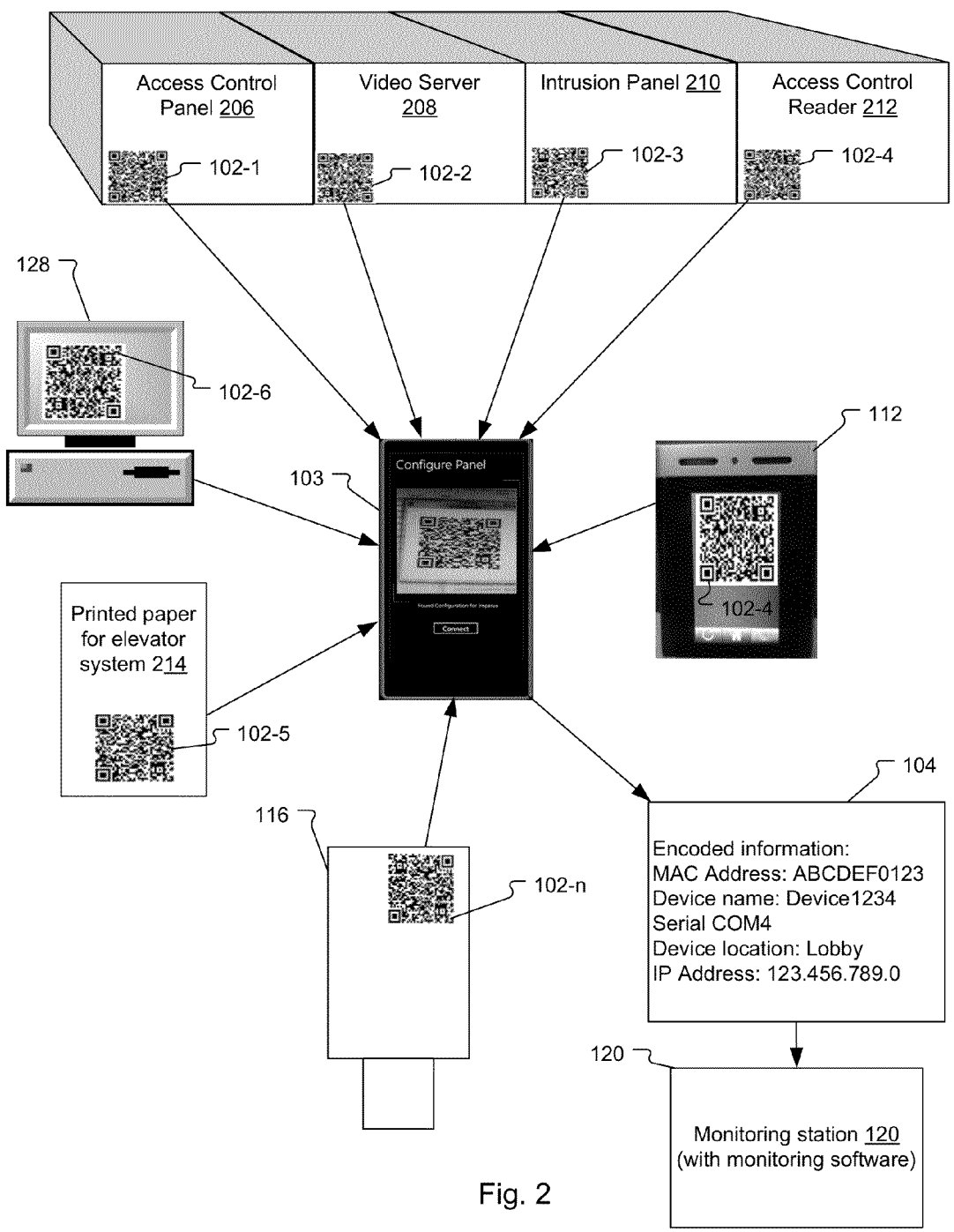
FIG. 2 is a schematic diagram illustrating different examples of how spatially-encoded optical machine-readable indicia are associated with security devices.

FIG. 2 is a schematic diagram illustrating different examples of how the spatially-encoded optical machine-readable indicia are associated with the security devices 106 to 116.

In one embodiment, the indicia 102-1 to 102-4 are printed on labels, which are adhered or affixed to the exterior of packages 206, 208, 210, and 212 housing the security devices (e.g., 106, 108, 110, and 112).

In another embodiment, the indicia are displayed on screens of computers, tablets, or other computing devices as an image. In the illustrated example, the indicium 102-6 is displayed on the screen of the workstation 128 as an image. In a typical implementation, the indicia are stored in a common image file format such as Joint Photographic Experts Group (JPEG). Alternatively, the indicia could be stored in other file formats such as Tagged Image File Format (TIFF), Portable Network Graphic (PNG), Graphics Interchange Format (GIF), or Bitmap (BMP), to list a few examples. Additionally, because the indicia are stored in common image file formats, they can be sent or received via electronic mail or short message service (SMS).

In another embodiment, the indicia are printed on paper. In the illustrated example, the indicium 102-5 for an elevator control system 114 is printed on a piece of paper 214, which typically is included in the shipping manifests for the security device.

In still another embodiment, the indicia are displayed on screens of the security devices 106 to 116. In the illustrated example, the indicium 102-4 for the access control reader 112 is displayed on the touchscreen display of the access control reader 112.

In still another embodiment, the indicia are affixed directly the exterior of the security devices. In the illustrated example, the indicium 102-n for the security camera 116 is adhered to the exterior of the security camera 116.

Figure 3:
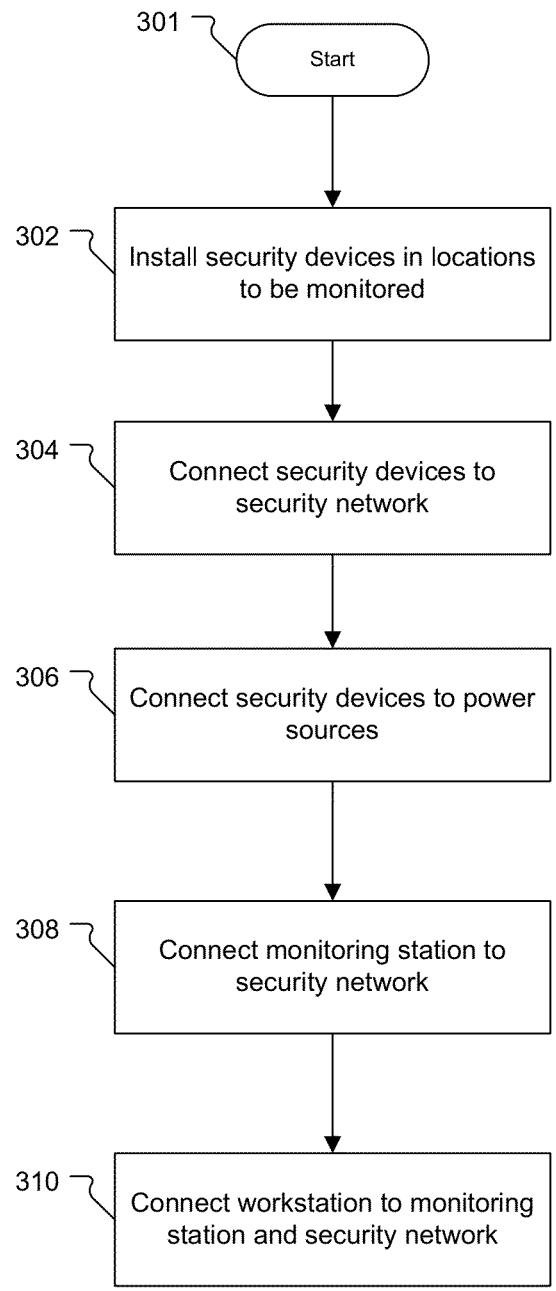
FIG. 3 is a flowchart illustrating the steps performed by an installer to install security devices on the security network of the security system at installation locations.

FIG. 3 is a flowchart illustrating the steps performed by an installer to install security devices 106 to 116 on the security network 119 of the security system 100 at installation locations.

In the first step 302, the security devices 106 to 116 are installed in locations of an office building. Typically, the installation locations are entry/exit points, parking lots, lobbies, or secure locations within the office building, to list a few examples. In the next step 304, the security devices 106 to 116 are connected to the security network 119 via data transmission cables. In the next step 306, the security devices 106 to 116 are connected to a power supply.

In the next step 308, the monitoring station 120 is connected to the security network 119. Next, in step 310, the workstation 128 is connected to the monitoring station 120 and the security network 119.

Figure 4:
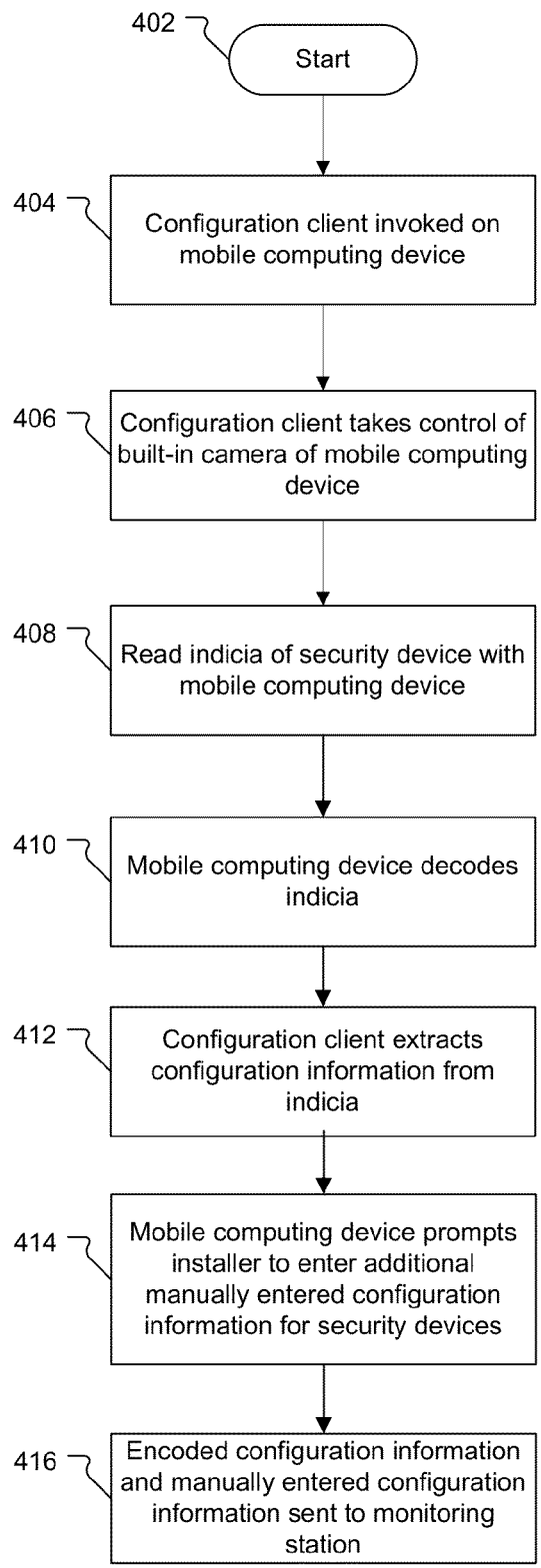
FIG. 4 is a flowchart illustrating the steps to read and decode spatially-encoded optical machine-readable indicia for security devices on the security network of a security system.

FIG. 4 is a flowchart illustrating the steps to read and decode indicia for security devices 106 to 116 on a security network 119 of a security system 100.

In the first step 404, the configuration client is invoked on the mobile computing device 103. The configuration client is typically proprietary (or possibly third party) software that enables installers to configure security devices. In the next step 406, the configuration client takes control of a built-in camera of the mobile computing device 103. In alternative embodiments where, for example, the indicia are received by electronic mail, the mobile computing device 103 is used to retrieve the image of the indicia from the electronic mail account that received the indicia.

In the next step 408, the mobile computing device reads the indicia of the security devices 106 to 116. In the next step 410, the mobile computing device decodes the indicia for the security devices 106 to 116.

In the next step 412, the configuration client extracts the configuration information from the indicia to be used to configure communication between the security devices 106 and monitoring station 120 over the security network 119.

In the next step 414, the mobile computing device prompts the installer to enter additional manually entered configuration information for the security devices 106 to 116. The additional manually entered configuration information often includes configuration information that might not be known until after the installation of the security devices (e.g., a device's specific location in the office building). Alternatively, the manually entered configuration information can be used to override the encoded configuration information extracted from the indicia.

In the next step 416, the encoded configuration information extracted from the indicia and any manually entered configuration information are sent to the monitoring station 120.

Figure 5:
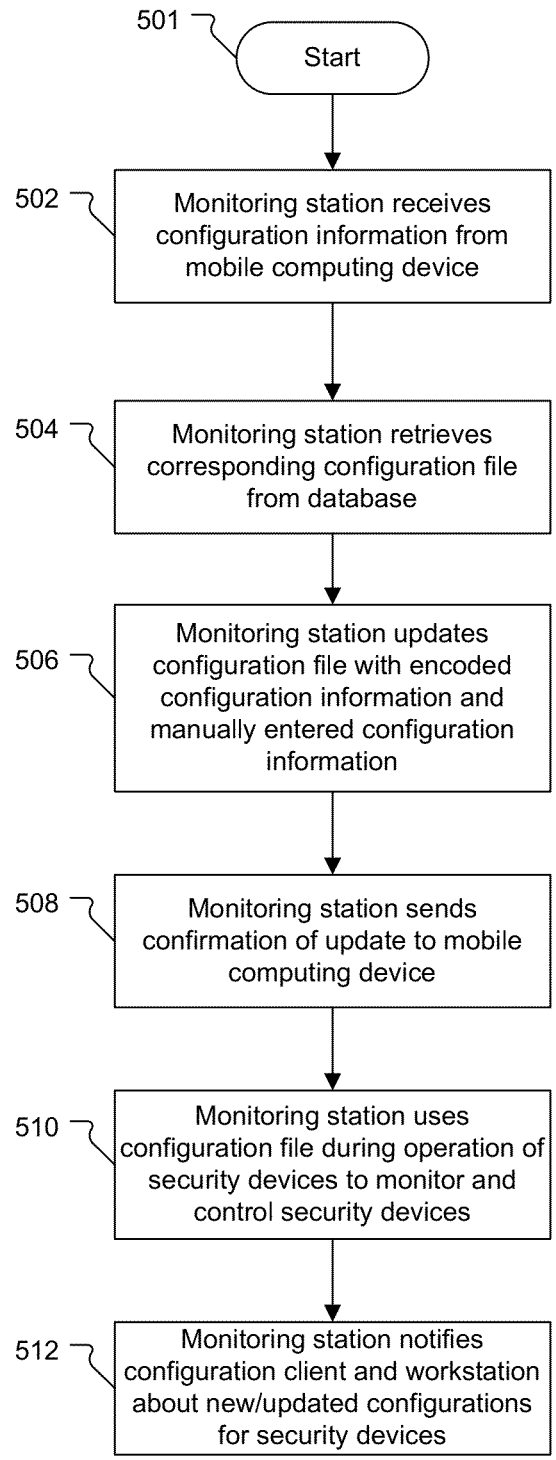
FIG. 5 is a flowchart illustrating the steps performed by the monitoring station when receiving configuration information from a mobile computing device.

FIG. 5 is a flowchart illustrating the steps performed by the monitoring station 120 when receiving configuration information from the mobile computing device 103.

In the first step 502, the monitoring station 120 receives the configuration information from the mobile computing device 103. In the next step 504, the monitoring station 120 retrieves a corresponding configuration file from the database 122.

In the next step 506, the monitoring station 120 updates the configuration file with the encoded configuration information and manually entered configuration information. This configuration information enables the monitoring station 120 to communicate with and/or control the security devices 106 to 116 on the security network 119.

In the next step 508, the monitoring station 120 sends a confirmation of the update back to the mobile computing device 103 to confirm the update of the configuration file in the database 122. In the next step 510, the monitoring station 120 uses configuration file during operation of the security devices to monitor and control security devices 106 to 116. Next, in step 512, the monitoring station 120 notifies the configuration client and workstation 128 about new (or updated) configurations for the security devices 106 to 116.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for configuring a security network of a security system, the method comprising:
reading spatially-encoded optical machine-readable indicia with a mobile computing device, the spatially-encoded optical machine-readable indicia encoding indicia configuration information for security devices of the security network of the security system;
decoding the indicia configuration information from the spatially-encoded optical machine-readable indicia;
prompting users to enter manually entered configuration information via the mobile computing device, the manually entered configuration information including location information for the security devices; and
using the indicia configuration information and the manually entered configuration information to configure communication with the security devices over the security network.

2. The method according to claim 1, wherein the spatially-encoded optical machine-readable indicia are two-dimensional bar codes, one-dimensional bar codes, or other machine-readable indicia.

3. The method according to claim 1, wherein the mobile computing device is a smartphone, tablet computer, or laptop computer.

4. The method according to claim 1, wherein the security devices are access control panels, intrusion panels, video servers, access control readers, elevator control systems, security cameras, motion sensors, or door controllers.

5. The method according to claim 1, wherein the security network includes wireless and/or wired portions.

6. The method according to claim 1, further comprising storing the indicia configuration information and the manually entered configuration information in a database that is accessed by a monitoring station to communicate with the security devices.

7. The method according to claim 1, wherein the indicia configuration information includes device names, IP addresses, media access control addresses, object globally unique identifiers, and/or serial port settings.

8. The method according to claim 1, further comprising displaying the spatially-encoded optical machine-readable indicia on a screen of the mobile computing device.

9. The method according to claim 1, further comprising printing the spatially-encoded optical machine-readable indicia on paper.

10. The method according to claim 1, further comprising storing the spatially-encoded optical machine-readable indicia as digital images.

11. The method according to claim 1, further comprising affixing the spatially-encoded optical machine-readable indicia to the security devices.

12. The method according to claim 1, further comprising printing the spatially-encoded optical machine-readable indicia onto labels and affixing the labels to packages housing the security devices.

13. The method according to claim 1, further comprising displaying the spatially-encoded optical machine-readable indicia on screens of the security devices.

14. The method according to claim 1, wherein the location information is IP addresses, device locations in an office building, and/or other device locations.

15. The method according to claim 1, further comprising updating a configuration file with the indicia configuration information and the manually entered configuration information and using the updated configuration file to monitor and control the security devices.

16. A security system with security network configuration capability, comprising:
   security devices for installation in a security network of the security system;
   spatially-encoded optical machine-readable indicia that are associated with the security devices and that encode indicia configuration information for the security devices;
   a mobile computing device that reads the indicia and decodes the indicia configuration information, wherein the mobile computing device prompts users to enter manually entered configuration information which includes location information for the security devices; and
   a monitoring station for monitoring the security devices in the security network, the monitoring station using the indicia configuration information and the manually entered configuration information from the mobile computing device to configure communication with the security devices over the security network.

17. The security system according to claim 16, wherein the spatially-encoded optical machine-readable indicia are two-dimensional bar codes, one-dimensional bar codes, or other machine-readable indicia.

18. The security system according to claim 16, wherein the mobile computing device is a smartphone, tablet computer, or laptop computer.

19. The security system according to claim 16, wherein the security devices are access control panels, intrusion panels, video servers, access control readers, elevator control systems, security cameras, motion sensors, or door controllers.

20. The security system according to claim 16, wherein the security network includes wireless and/or wired portions.

21. The security system according to claim 16, further comprising a database for storing the indicia configuration information and the manually entered configuration information, which is accessed by a monitoring station to communicate with the security devices.

22. The security system according to claim 16, wherein the indicia configuration information includes device names, IP addresses, media access control addresses, object globally unique identifiers, and/or serial port settings.

23. The security system according to claim 16, wherein the spatially-encoded optical machine-readable indicia are displayed on a screen of the mobile computing device.

24. The security system of claim 16, wherein the spatially-encoded optical machine-readable indicia are printed on paper.

25. The security system according to claim 16, wherein the spatially-encoded optical machine-readable indicia are stored as digital images.

26. The security system according to claim 16, wherein the spatially-encoded optical machine-readable indicia are affixed directly to the security devices.

27. The security system according to claim 16, wherein the spatially-encoded optical machine-readable indicia are printed onto labels and affixed to packages housing the security devices.

28. The security system according to claim 16, wherein the spatially-encoded optical machine-readable indicia are displayed on screens of the security devices.

29. The security system according to claim 16, wherein the location information is IP addresses, device locations in an office building, and/or other device locations.

30. The security system according to claim 16, wherein the monitoring station updates a configuration file with the indicia configuration information and the manually entered configuration information and the monitoring station uses the updated configuration file to monitor and control the security devices.

* * * * *